(12) United States Patent
Morrison

(10) Patent No.: US 11,391,969 B2
(45) Date of Patent: Jul. 19, 2022

(54) SYSTEMS AND METHODS FOR WAVELENGTH MONITORING

(71) Applicant: FREEDOM PHOTONICS LLC, Goleta, CA (US)

(72) Inventor: Gordon Barbour Morrison, Summerland, CA (US)

(73) Assignee: Freedom Photonics LLC, Goleta, CA (US)

( * ) Notice: Subject to any disclaimer, the term of this patent is extended or adjusted under 35 U.S.C. 154(b) by 38 days.

(21) Appl. No.: 16/213,917

(22) Filed: Dec. 7, 2018

(65) Prior Publication Data
US 2020/0183195 A1 Jun. 11, 2020

(51) Int. Cl.
*G02F 1/01* (2006.01)
*G02F 1/21* (2006.01)

(52) U.S. Cl.
CPC .............. *G02F 1/0147* (2013.01); *G02F 1/21* (2013.01); *G02F 2203/50* (2013.01)

(58) Field of Classification Search
CPC ...... G02F 1/0147; G02F 1/21; G02F 2203/50; G02B 5/28–289; H01S 3/10; G01B 9/02
USPC ................................................. 359/208, 288
See application file for complete search history.

(56) References Cited

U.S. PATENT DOCUMENTS

| | | | |
|---|---|---|---|
| 5,212,584 A | 5/1993 | Chung | |
| 5,798,859 A | 8/1998 | Colbourne et al. | |
| 6,178,002 B1 * | 1/2001 | Mueller-Wirts | G01J 9/02 356/491 |
| 6,844,975 B2 | 1/2005 | Sargent et al. | |
| 7,420,686 B2 | 9/2008 | Tan | |
| 2002/0172239 A1 | 11/2002 | McDonald et al. | |
| 2008/0137089 A1 | 6/2008 | Tan | |
| 2012/0075636 A1 | 3/2012 | Zilkie | |
| 2014/0125991 A1 * | 5/2014 | Johnson | G01B 9/02 356/497 |
| 2014/0369368 A1 | 12/2014 | Carter et al. | |
| 2015/0153512 A1 * | 6/2015 | Grote | G02B 6/1221 385/42 |
| 2017/0261669 A1 * | 9/2017 | Jiang | G02B 27/283 |

FOREIGN PATENT DOCUMENTS

| | | |
|---|---|---|
| EP | 0 001 714 A1 | 5/1979 |
| EP | 0 568 242 A1 | 11/1993 |

OTHER PUBLICATIONS

Hecht, Eugene. Optics. 4th ed., Addison Wesley, 2002, p. 421. (Year: 2002).*

* cited by examiner

*Primary Examiner* — Kristina M Deherrera
(74) *Attorney, Agent, or Firm* — Knobbe Martens Olson & Bear LLP

(57) ABSTRACT

Devices configured to determine wavelength of light, monitoring wavelength or provide a reference wavelength are disclosed. The devices can comprise a plurality of etalons. The plurality of peaks in the transmission or reflection spectrum of different etalons of the plurality of etalons can be phase shifted with respect to each other in wavelength space. The plurality of etalons can comprise materials with different group index of refraction or materials with different thermal responses. Phase shift of the plurality of peaks in the transmission or reflection spectrum of different etalons in wavelength space can be accomplished by changing the relative temperature between the different etalons.

41 Claims, 8 Drawing Sheets

SYSTEMS AND METHODS FOR WAVELENGTH MONITORING

BACKGROUND

Field of the Invention

Various embodiments of this application relate to the field of wavelength monitoring.

Description of the Related Art

Determining and/or monitoring wavelength of light is useful in many applications including but not limited to telecommunication, sensing and interferometry. Wavelength monitors comprising optical etalons can be used to identify, measure, reference, monitor and/or discriminate between different wavelengths of light.

SUMMARY

Example embodiments described herein have several features, no single one of which is indispensable or solely responsible for their desirable attributes. Without limiting the scope of the claims, some of the advantageous features will now be summarized.

Embodiment 1: An optical device comprising:

a first etalon comprising a first reflector and a second reflector and an optical cavity therebetween, the optical cavity of the first etalon having a first optical path length, the optical cavity of the first etalon comprising a first material, wherein a transmission spectrum of the first etalon or a reflection spectrum of the first etalon has a plurality of peaks; and a second etalon comprising a first reflector and a second reflector and an optical cavity therebetween, the optical cavity of the second etalon having a second optical path length, the optical cavity of the second etalon comprising a second material, wherein a transmission spectrum of the second etalon or a reflection spectrum of the second etalon has a plurality of peaks, wherein at least one of (i) a group refractive index or an effective refractive index of the first material is different from a group refractive index or an effective refractive index of the second material or (ii) a variation of the group refractive index or the effective refractive index of the first material with respect to temperature is different from a variation of the group refractive index or the effective refractive index of the second material with respect to temperature, and wherein at least one of (a) said first optical path length and the second optical path or (b) the angle of incidence of an incident light beam with respect to the first etalon and the angle of incidence of the incident light beam with respect to the second etalon is configured so as to provide a phase shift between the plurality of peaks in the transmission spectrum or reflection spectrum of the first etalon and the plurality of peaks in the transmission spectrum or reflection spectrum of the second etalon.

Embodiment 2: The optical device of Embodiment 1, wherein the phase shift is greater than or equal to 0 degrees and less than or equal to about 20 degrees.

Embodiment 3: The optical device of any of Embodiments 1-2, wherein the phase shift is greater than or equal to 70 degrees and less than or equal to about 110 degrees.

Embodiment 4: The optical device of any of Embodiments 1-3, wherein the phase shift is greater than or equal to 160 degrees and less than or equal to about 200 degrees.

Embodiment 5: The optical device of any of Embodiments 1-4, further comprising a temperature control system configured to change temperature of at least one of the first etalon or the second etalon.

Embodiment 6: The optical device of Embodiment 5, further comprising a temperature control system configured to change temperature of the first etalon and the second etalon.

Embodiment 7: The optical device of any of Embodiments 5-6, wherein the temperature control system further comprises a thermoelectric cooler thermally coupled to at least one of the first etalon or the second etalon.

Embodiment 8: The optical device of any of Embodiments 5-7, wherein the temperature control system further comprises a temperature sensor thermally coupled to at least one of the first etalon or the second etalon.

Embodiment 9: The optical device of Embodiment 8, wherein the temperature control system further comprises a temperature controller configured to control the thermoelectric cooler based on information from the temperature sensor.

Embodiment 10: The optical device of Embodiment 8, wherein the temperature sensor comprises a thermistor or a thermocouple.

Embodiment 11: The optical device of any of Embodiments 1-10, further comprising a thermal base, wherein the first etalon and the second etalon are disposed on the thermal base.

Embodiment 12: The optical device of Embodiment 11, wherein the thermal base comprises a thermally conductive material.

Embodiment 13: The optical device of any of Embodiments 11-12, wherein the thermal base is thermally coupled to a thermoelectric cooler and a thermal sensor.

Embodiment 14: The optical device of any of Embodiments 11-13, further comprising a temperature controller configured to maintain the thermal base at a desired temperature such that the first etalon and the second etalon are both maintained at the desired temperature.

Embodiment 15: The optical device of any of Embodiments 5-14, wherein the temperature control system is configured to change the phase shift between the between the plurality of peaks in the transmission spectrum or reflection spectrum of the first etalon and the plurality of peaks in the transmission spectrum or reflection spectrum of the second etalon by changing the temperature of at least one of the first etalon or the second etalon to increase wavelength sensitivity or wavelength resolution of the optical device.

Embodiment 16: The optical device of any of Embodiments 1-15, further comprising a first photodetector configured to measure light reflected from the first etalon, and a second photodetector configured to measure light reflected from the second etalon.

Embodiment 17: The optical device of any of Embodiments 1-16, further comprising a first photodetector configured to measure light transmitted through the first etalon, and a second photodetector configured to measure light transmitted through the second etalon.

Embodiment 18: The optical device of any of Embodiments 1-17, further comprising a first photodetector configured to measure light transmitted through the first etalon, and a second photodetector configured to measure light reflected from the second etalon.

Embodiment 19: The optical device of any of Embodiments 1-18, configured to monitor wavelength of the incident light beam.

Embodiment 20: An optical device comprising:
a first optical cavity comprising a first material, the first optical cavity bound by a pair of reflective surfaces, the first optical cavity configured to receive incident light at a first angle of incidence;
a second optical cavity comprising a second material different from the first material, the second optical cavity bound by a pair of reflective surfaces, the second optical cavity configured to receive the incident light at a second angle of incidence;
a first photodetector disposed with respect to the first optical cavity; and
a second photodetector disposed with respect to the second optical cavity,
wherein an optical path length of the first optical cavity and an optical path length of the second optical cavity or the first angle of incidence and the second angle of incidence are configured such that a plurality of peaks in the transmission or refection spectrum of the first optical cavity are shifted with respect to a plurality of peaks in the transmission or refection spectrum of the second optical cavity.

Embodiment 21: The optical device of Embodiment 20, wherein location of the maxima of the plurality of peaks in the transmission or refection spectrum of the second optical cavity coincide with location of the plurality of peaks in the transmission or refection spectrum of the first optical cavity having slope greater than slope at the maxima.

Embodiment 22: The optical device of any of Embodiments 20-21, further comprising:
a third photodetector disposed with respect to the first optical cavity; and
a fourth photodetector disposed with respect to the second optical cavity.

Embodiment 23: The optical device of Embodiment 22, wherein the first photodetector is configured to receive light reflected from the first optical cavity, and wherein the third photodetector is configured to receive light transmitted through the first optical cavity.

Embodiment 24: The optical device of any of Embodiments 22-23, wherein the second photodetector is configured to receive light reflected from the second optical cavity, and wherein the fourth photodetector is configured to receive light transmitted through the second optical cavity.

Embodiment 25: The optical device of any of Embodiments 20-24, further comprising at least one temperature controller configured to change temperature of at least one of the first optical cavity or the second optical cavity.

Embodiment 26: The optical device of any of Embodiments 20-25, wherein the first optical cavity and the second optical cavity are disposed on a thermal base.

Embodiment 27: The optical device of Embodiment 26, further comprising:
a temperature sensor thermally coupled to the thermal base;
a thermoelectric cooler thermally coupled to the thermal base; and
a temperature controller configured to maintain the thermal base at a desired temperature.

Embodiment 28: The optical device of Embodiment 27, wherein the temperature controller is configured to change the temperature of the thermal base from a first temperature to a second temperature.

Embodiment 29: The optical device of Embodiment 28, wherein a thermal response of the first material is different from a thermal response of the second material such that the plurality of peaks in the transmission or refection spectrum of the first optical cavity are further shifted with respect to a plurality of peaks in the transmission or reflection spectrum of the second optical cavity in wavelength space in response to a change in the temperature of the thermal base from the first temperature to the second temperature.

Embodiment 30: An optical device comprising:
a first optical cavity comprising a first material, the first optical cavity bound by a pair of reflective surfaces;
a second optical cavity comprising a second material different from the first material, the second optical cavity bound by a pair of reflective surfaces;
a first photodetector disposed with respect to the first optical cavity;
a second photodetector disposed with respect to the second optical cavity; and
a temperature controller configured to change temperature of at least one of the first optical cavity or the second optical cavity.

Embodiment 31: The optical device of Embodiment 30, wherein a plurality of peaks in the transmission or refection spectrum of the first optical cavity are shifted with respect to a plurality of peaks in the transmission or refection spectrum of the second optical cavity in response to a change in temperature of at least one of the first optical cavity or the second optical cavity.

Embodiment 32: The optical device of any of Embodiments 30-31, wherein the first optical cavity and the second optical cavity are disposed on a common thermal base.

Embodiment 33: The optical device of any of Embodiments 30-32, wherein the common thermal base is thermally coupled to a thermoelectric cooler.

Embodiment 34: The optical device of any of Embodiments 30-33, wherein the temperature controller is configured to provide signals to the thermoelectric cooler to maintain the common thermal base at a common temperature such that the first optical cavity and the second optical cavity are maintained at the common temperature.

BRIEF DESCRIPTION OF THE DRAWINGS

In the following description of the various embodiments, reference is made to the accompanying drawings which form a part hereof, and in which is shown by way of illustration various embodiments of the device.

It is to be understood that other embodiments may be utilized and structural changes may be made without departing from the scope of present invention.

Figure 1:
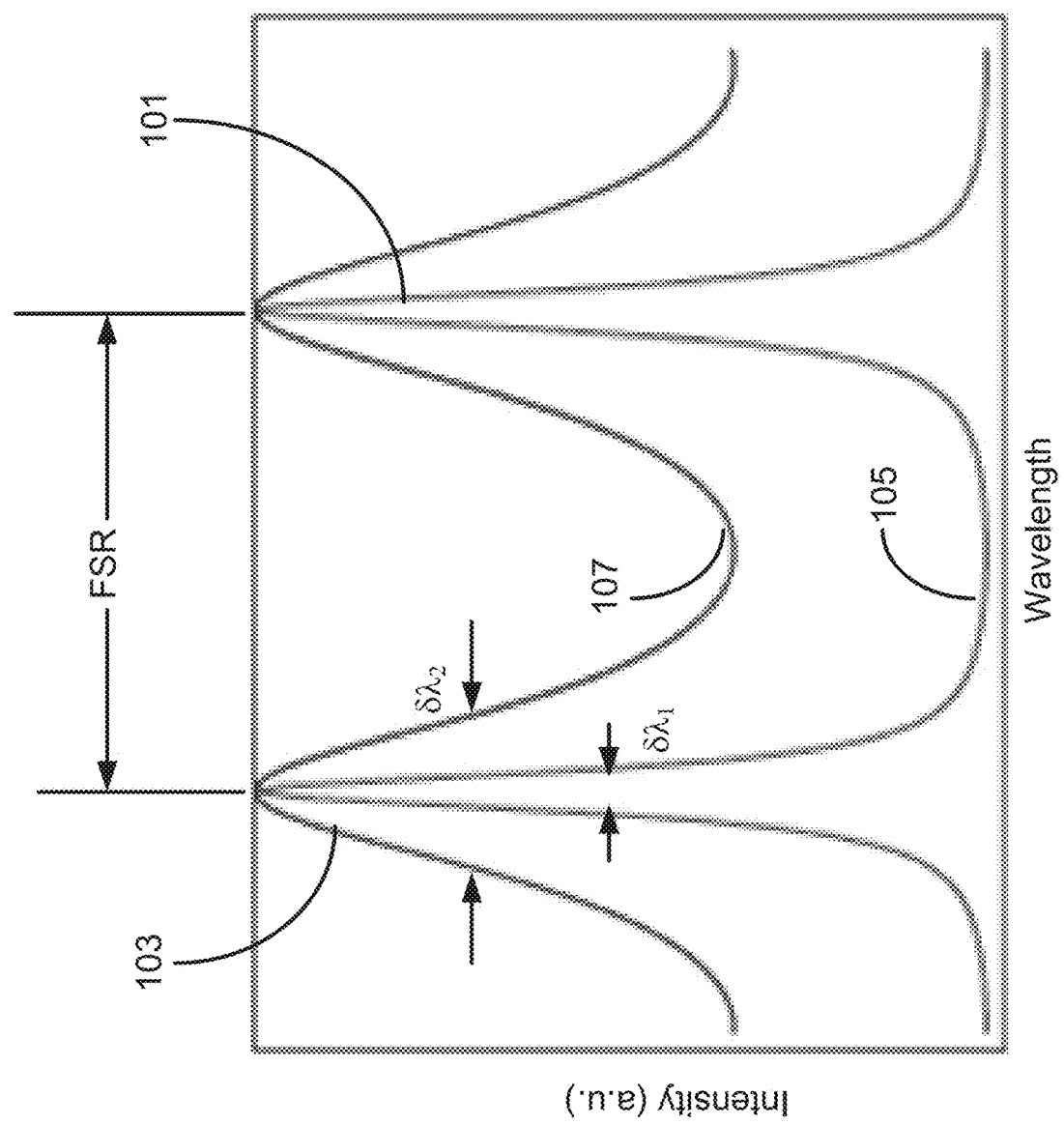
FIG. 1 shows the transmission (or reflection) spectrum for etalons with different finesse.

These and other features will now be described with reference to the drawings summarized above. The drawings and the associated descriptions are provided to illustrate embodiments and not to limit the scope of the disclosure or claims. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION OF CERTAIN PREFERRED EMBODIMENTS

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied using a variety of techniques including techniques that may not be described herein but are known to a person having ordinary skill in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements may be present therebetween. For clarity of description, "reflector" or "mirror" can be used interchangeably to refer to an optical element and/or a surface having a reflectivity greater than or equal to about 0.01% and less than or equal to 100%. For example, an optical element and/or a surface having a reflectivity greater than or equal to about 5% and less than or equal to 99%, greater than or equal to about 10% and less than or equal to 90%, greater than or equal to about 15% and less than or equal to 80%, greater than or equal to about 20% and less than or equal to 70%, greater than or equal to about 30% and less than or equal to 60%, or any value in any range/sub-range defined by these values can be considered as a reflector or mirror.

An etalon may comprise an optical cavity bounded by reflectors. In various embodiments one or both the reflectors can comprise a planar reflective surface. The angle of incidence of light incident on the etalon can be measured with respect to a normal to the surface of the reflective surface receiving the incident light. The optical cavity can comprise a dielectric material, such as, for example, air, glass, silicon, etc. between the reflectors. Light propagating in the optical cavity is reflected by the reflectors multiple times. As a result of multiple reflections, the transmission (or reflection) characteristics of the various embodiments of the etalon may include a plurality of peaks and valleys that are periodic in wavelength space. In various embodiments, the plurality of peaks and valleys have a maximum intensity and a minimum intensity respectively, and sloping regions corresponding to rising or falling intensity. The change in the intensity with wavelength in the vicinity of the maximum or minimum intensity can be lesser than the change in the intensity with wavelength in the sloping regions. The spectrally repetitive transmissive and reflective properties of various embodiments of an etalon can be used in applications including but not limited to telecommunications, sensing (e.g., gas sensing and/or atomic sensing) and interferometry to identify, measure, reference, monitor or otherwise discriminate wavelength of light. For example, the periodicity of the transmission (or reflection) characteristics of various embodiments of optical etalons can provide a plurality of wavelengths which can be used as reference wavelengths in optical telecommunication systems. As another example, various embodiments of etalons can be used as tunable wavelength filters. As yet another example, various embodiments of an etalon can be used to discriminate between two different wavelengths based on differences in the intensity of transmitted (or reflected light).

The distance between consecutive transmission (or reflection) peaks in the wavelength space (or frequency space) in the transmission (or reflection) versus wavelength (or frequency) spectrum or characteristic of an etalon may be referred to as Free Spectral range (FSR). The finesse of an etalon can be defined as the FSR divided by the full width at half-maximum (3-dB bandwidth) of an individual transmission (or reflection) peak. Various embodiments of etalons can be configured to have high finesse by reducing the 3-dB bandwidth of an individual transmission (or reflection) peak and/or increasing the distance between consecutive transmission (or reflection) peaks in the transmission (or reflection) versus wavelength (or frequency) spectrum or characteristic.

FIG. 1 shows the transmission spectrum 101 for two different embodiments of an etalon one having a higher finesse than the other. Namely, curve 101 shows the variation of the intensity of transmitted light from a first embodiment of an etalon having a relatively high finesse. In contrast, curve 103 shows the variation of the intensity of transmitted light from a second embodiment of an etalon having a relatively low finesse. In FIG. 1, the FSR of the first embodiment of the etalon is the same as the FSR of the second embodiment of the etalon. However, the 3-dB bandwidth of an individual transmission peak $\delta\lambda_1$, of the first embodiment of the etalon is significantly smaller than the 3-dB bandwidth of an individual transmission peak, $\delta\lambda_2$, of the second etalon, which results in a difference in the finesse of the two etalons.

The regions of the transmission spectrum where the transmissivity does not vary as significantly with wavelength can be referred to "dead zones". For example, in FIG. 1, regions 105 and 107 can correspond to the dead zones of curves 101 and 103, respectively. Without any loss of generality, the dead zones in the transmission spectra of the etalon can coincide with the spectral regions where the derivative of the transmissivity or reflectivity is relatively small (e.g., possibly approximately zero). For example, the dead zones in the transmission spectrum can coincide with regions of the transmission spectrum where the intensity is maximum or close to the maximum (e.g., near the peaks) or where the intensity is minimum or close to the minimum (e.g., near the valleys). The dead zones in etalons having a relatively high finesse can be broad (or large) in wavelength space as noted from curve 101 of FIG. 1. Conversely the dead zones in etalons having a relatively low finesse can be narrow (or small) in wavelength space as noted from curve 103 of FIG. 1. While the extent of the dead zone is reduced in various embodiments of etalons having a relatively lower finesse as compared to the extent of the dead zone in various embodiments of etalons having a relatively higher finesse, the contrast ratio corresponding to the ratio of the maximum intensity to the minimum intensity, may in some cases, also be reduced in etalons having a relatively lower finesse as compared to the contrast ratio in etalons having a relatively higher finesse. In a system comprising an etalon that is configured to determine, monitor and/or discriminate between different wavelengths of light, it may be advantageous to have high contrast ratio and smaller dead zones to increase accuracy of the measurement and/or increase resolution of the system.

One technique to improve the resolution of wavelength discrimination includes using more than one etalon. For example, various systems configured to determine, monitor and/or discriminate between different wavelengths of light can comprise a first etalon and a second etalon. In various embodiments, the first and second etalons can have substantially similar FSR and finesse. In some such embodiments, there may be a phase difference between the peaks and valleys in the transmission (or reflection) spectrum of the first and second etalons such that the transmission (or reflection) peaks and valleys occur at different locations in the wavelength spectrum or wavelength space. For example, the transmission (or reflection) spectra of the first and second etalons can be phase shifted with respect to each other such that the peaks and valleys in the transmission (or reflection) spectrum of a first etalon corresponding to the regions of reduced variation in intensity with wavelength (or reduced wavelength discrimination) are aligned with the sloping regions corresponding to the regions of increased variation in intensity with wavelength (or increased wavelength discrimination) of the transmission (or reflection) spectrum of a second etalon. For example, the phase difference between the transmission (or reflection) spectra of the first and second etalons can be 90 degrees so that the peaks and valleys of the first etalon corresponding to regions of reduced wavelength discrimination are aligned with the region of transmission (or reflection) spectrum of the second etalon having the maximum slope, which corresponds to regions of increased wavelength discrimination. Such a configuration can be referred to as placing the etalons in quadrature.

In various embodiments, the phase difference between the transmission (or reflection) spectra of the two etalons can be in a range of between 70 degrees and about 110 degrees (e.g., greater than or equal to about 70 degrees and less than or equal to about 75 degrees, greater than or equal to about 73 degrees and less than or equal to about 80 degrees, greater than or equal to about 77 degrees and less than or equal to about 85 degrees, greater than or equal to about 83 degrees and less than or equal to about 90 degrees, greater than or equal to about 87 degrees and less than or equal to about 95 degrees, greater than or equal to about 93 degrees and less than or equal to about 100 degrees, greater than or equal to about 97 degrees and less than or equal to about 105 degrees, greater than or equal to about 103 degrees and less than or equal to about 110 degrees, or any value in a range/sub-range defined by any of these values). In some embodiments, the phase difference between the transmission (or reflection) spectra of the two etalons can be in a range between 150 degrees and about 200 degrees (e.g., greater than or equal to about 155 degrees and less than or equal to about 195 degrees, greater than or equal to about 160 degrees and less than or equal to about 190 degrees, greater than or equal to about 165 degrees and less than or equal to about 185 degrees, greater than or equal to about 170 degrees and less than or equal to about 180 degrees, or any value in a range/sub-range defined by any of these values). Values outside these ranges are also possible.

As discussed below, the phase shift between the transmission (or reflection) spectrum of two different etalons can be achieved by changing the optical path length of the two different etalons. Without any loss of generality, the optical path length of an etalon can be changed by changing the material in the cavity of the etalon, changing the physical length of the cavity, changing the orientation of the cavity with respect to the direction of incident light and/or by changing temperature at which the etalon is maintained.

Other embodiments of systems configured to determine, monitor and/or discriminate between different wavelengths of light can comprise three, four or more etalons. The different etalons in such embodiments may be phase shifted with respect to each other. For example, the phase difference between the transmission (or reflection) spectra of the different etalons can be greater than or equal to about 0 degree and less than or equal to about 20 degrees, greater than or equal to about 15 degrees and less than or equal to about 30 degrees, greater than or equal to about 25 degrees and less than or equal to about 45 degrees, greater than or equal to about 35 degrees and less than or equal to about 60 degrees, greater than or equal to about 50 degrees and less than or equal to about 75 degrees, greater than or equal to about 65 degrees and less than or equal to about 90 degrees, greater than or equal to about 80 degrees and less than or equal to about 105 degrees, greater than or equal to about 95 degrees and less than or equal to about 120 degrees, greater than or equal to about 110 degrees and less than or equal to about 135 degrees, greater than or equal to about 125 degrees and less than or equal to about 150 degrees, greater than or equal to about 140 degrees and less than or equal to about 165 degrees, greater than or equal to about 155 degrees and less than or equal to about 180 degrees, greater than or equal to about 170 degrees and less than or equal to about 195 degrees, greater than or equal to about 185 degrees and less than or equal to about 210 degrees, or any value in a range/sub-range defined by any of these values. Values outside these ranges are also possible. In various embodiments, the phase difference between the different etalons can be configured such that most wavelengths (e.g., greater than or equal to 75% of wavelengths, greater than or equal to 80% of wavelengths, greater than or equal to 90% of wavelengths, greater than or equal to 95% of wavelengths, or any range between 99% and 100% of wavelengths) in a wavelength range about a center wavelength coincide with the sloping region of the transmission (or reflection) spectrum of at least one etalon corresponding to the region of increased variation in the intensity (or increased wavelength discrimination).

In various embodiments, the wavelength range can be between about 100 nm and about 250 nm, such as, for example, greater than or equal to about 100 nm and less than or equal to about 150 nm, greater than or equal to about 125 nm and less than or equal to about 175 nm, greater than or equal to about 150 nm and less than or equal to about 200 nm, greater than or equal to about 175 nm and less than or equal to about 225 nm, greater than or equal to about 200 nm and less than or equal to about 250 nm, or any value in a range/sub-range defined by any of these values. In other embodiments, the wavelength range can be greater than 250 nm, such as, for example, greater than or equal to about 300 nm and less than or equal to about 800 nm, greater than or equal to about 450 nm and less than or equal to about 750 nm, greater than or equal to about 500 nm and less than or equal to about 700 nm or any value in a range/sub-range defined by any of these values. Values outside these ranges are also possible.

In various embodiments, the center wavelength can have a value between about 1200 nm and about 1800 nm. For example, the center wavelength can have a value between about 1200 nm and about 1300 nm, between about 1250 nm and about 1350 nm, between about 1300 nm and about 1400 nm, between about 1350 nm and about 1450 nm, between about 1400 nm and about 1500 nm, between about 1450 nm and about 1550 nm, between about 1500 nm and about 1600 nm, between about 1550 nm and about 1650 nm, between about 1600 nm and about 1700 nm, between about 1650 nm and about 1750 nm, between about 1700 nm and about 1800 nm, or any value in a range/sub-range defined by any of these values. In some embodiments, the center wavelength can have a value less than 1200 nm or greater than 1800 nm. Values outside these ranges are also possible. For example, in some embodiments, the center wavelength can have a value between about 200 nm and about 1199 nm or between about 1801 nm and about 10 microns.

Various embodiments of systems that are configured to determine, monitor and/or discriminate between different wavelengths of light using one or more etalons described herein can be configured to operate in a wavelength range between about 100 nm and about 250 nm about a center wavelength having a value between about 1200 nm and about 1800 nm. For example, various embodiments of systems that are configured to determine, monitor and/or discriminate between different wavelengths of light comprising one or more etalons described herein can be configured to operate in a wavelength range between about 1500 nm and about 1750 nm. As another example, various embodiments of systems that are configured to determine, monitor and/or discriminate between different wavelengths of light comprising one or more etalons described herein can be configured to operate in a wavelength range between about 1500 nm and about 1620 nm. As yet another example, various embodiments of systems that are configured to determine, monitor and/or discriminate between different wavelengths of light comprising one or more etalons described herein can be configured to operate in a frequency range of at least about ±50 GHz (e.g, ±100 GHz, or ±200 GHz) about a center wavelength having a value between about 1200 nm and about 1800 nm.

Without any loss of generality, in embodiments of systems configured to determine, monitor and/or discriminate between different wavelengths of light comprising a plurality of etalons whose transmission (or reflection) spectrum are phase shifted with respect to each other, an individual etalon of the plurality of etalons can be configured to have high finesse. In such embodiments, the dead zones in the transmission (or reflection) spectrum of an individual etalon of a plurality of etalons can be covered by the sloping regions of other etalons of the plurality of etalons.

Figure 2A:
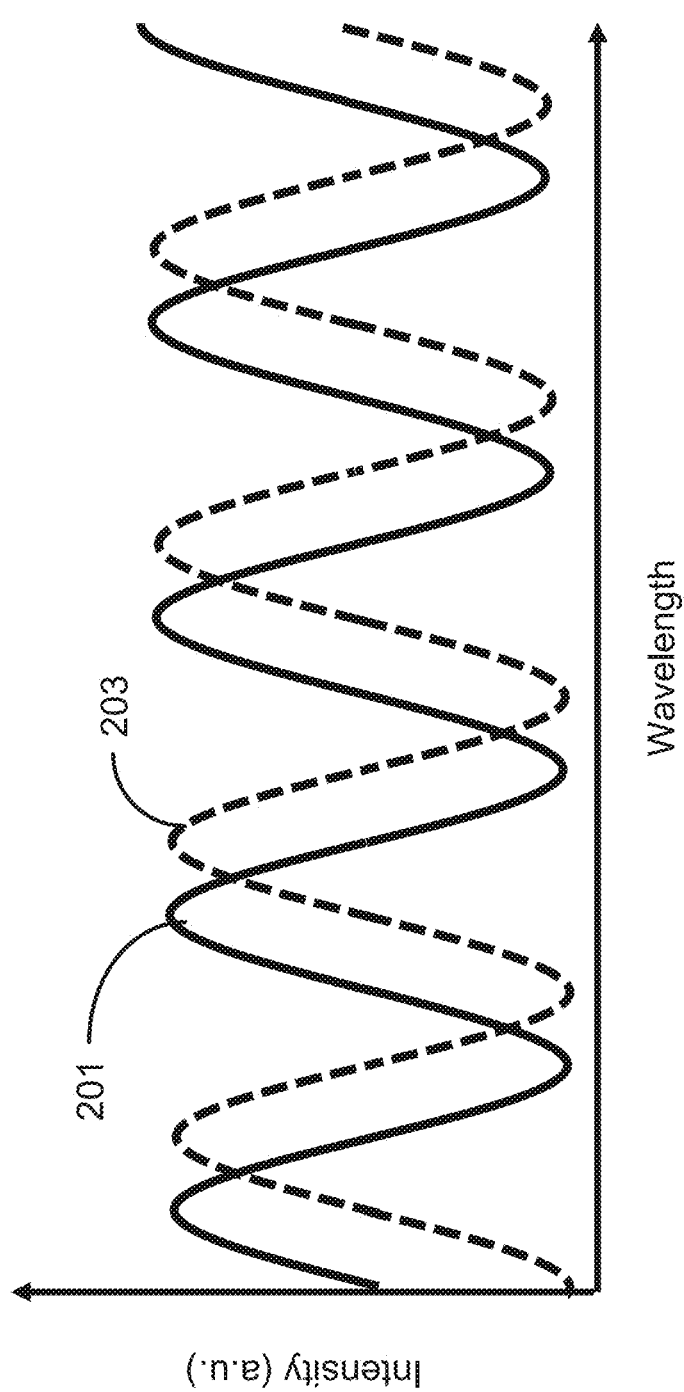
FIG. 2A shows the transmission (or reflection) spectrum for two different etalons wherein the transmission (or reflection) spectrum for one of the etalons is shifted with respect to the transmission (or reflection) spectrum for another one of the etalons (e.g., by about 90 degrees).
Figure 2B:
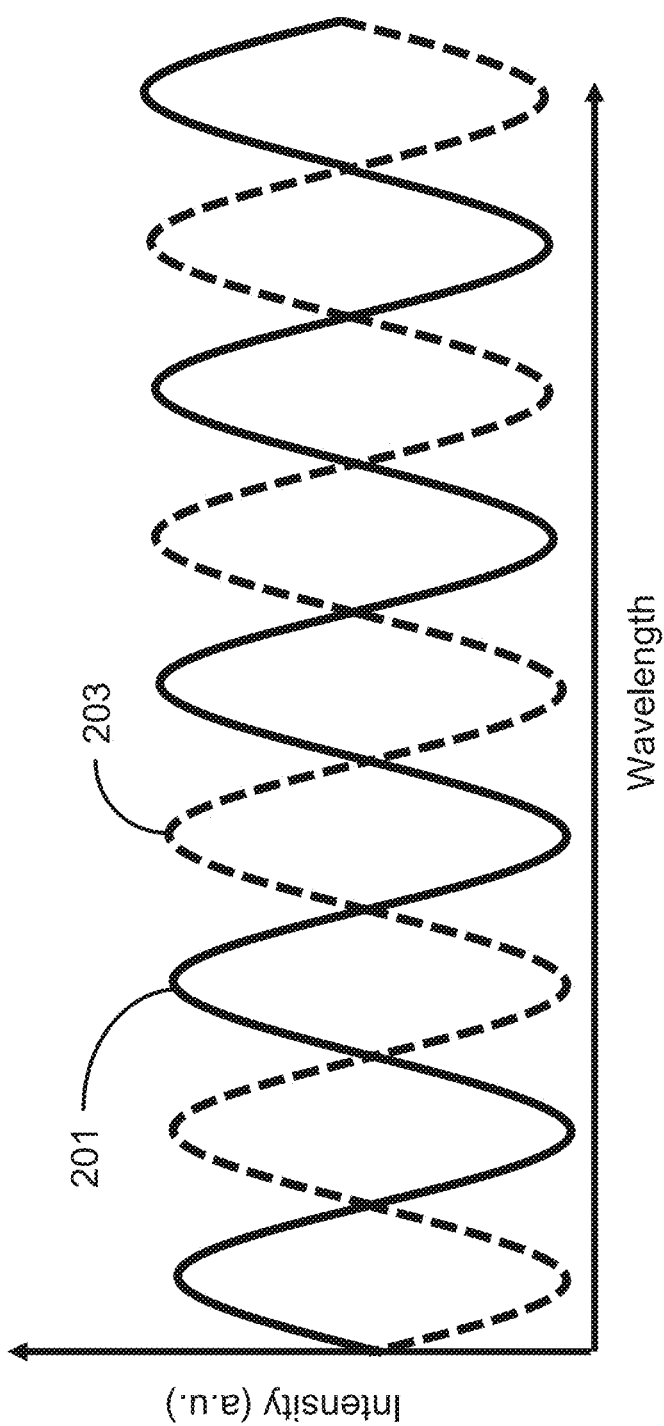
FIG. 2B shows the transmission (or reflection) spectrum for two different etalons wherein the transmission (or reflection) spectrum for one of the etalons is shifted with respect to the transmission (or reflection) spectrum for another one of the etalons (e.g., by about 180 degrees).

FIGS. 2A and 2B show the transmission (or reflection) spectrum in a desired wavelength range for two different embodiments of etalon pairs. As discussed above, the transmission (or reflection) spectrum of the two different etalons is phase shifted with respect to each other. Curve 201 shows the transmission (or reflection spectrum) of a first etalon and curve 203 shows the phase shifted transmission (or reflection spectrum) of a second etalon. As discussed above, the phase shift between the transmission (or reflection) spectrum of the two different etalons can be greater than or equal to about 0 degree and less than or equal to about 20 degrees, greater than or equal to about 15 degrees and less than or equal to about 30 degrees, greater than or equal to about 25 degrees and less than or equal to about 45 degrees, greater than or equal to about 35 degrees and less than or equal to about 60 degrees, greater than or equal to about 50 degrees and less than or equal to about 75 degrees, greater than or equal to about 65 degrees and less than or equal to about 90 degrees, greater than or equal to about 80 degrees and less than or equal to about 105 degrees, greater than or equal to about 95 degrees and less than or equal to about 120 degrees, greater than or equal to about 110 degrees and less than or equal to about 135 degrees, greater than or equal to about 125 degrees and less than or equal to about 150 degrees, greater than or equal to about 140 degrees and less than or equal to about 165 degrees, greater than or equal to about 155 degrees and less than or equal to about 180 degrees, greater than or equal to about 170 degrees and less than or equal to about 195 degrees, greater than or equal to about 185 degrees and less than or equal to about 210 degrees, or any value in a range/sub-range defined by any of these values. Values outside these ranges are also possible.

In FIG. 2A, the transmission (or reflection) spectrum of the two different etalons are approximately 90 degrees out of phase with each other. Accordingly, in this embodiment, the "dead zones" or maxima/minima of the transmission (or reflection) spectrum of one etalon, are aligned with the region including the maximum slope in intensity for the other etalon. As a result, it is possible to discriminate between any two wavelengths in the desired wavelength range using a system comprising the two phase shifted etalons.

In FIG. 2B, the transmission (or reflection) spectrum of the two different etalons are approximately 180 degrees out of phase with each other. Accordingly, in this embodiment, the maxima of the transmission (or reflection) spectrum of one etalon, are aligned with the minima of the transmission (or reflection) spectrum of the other etalon.

Figure 3B:
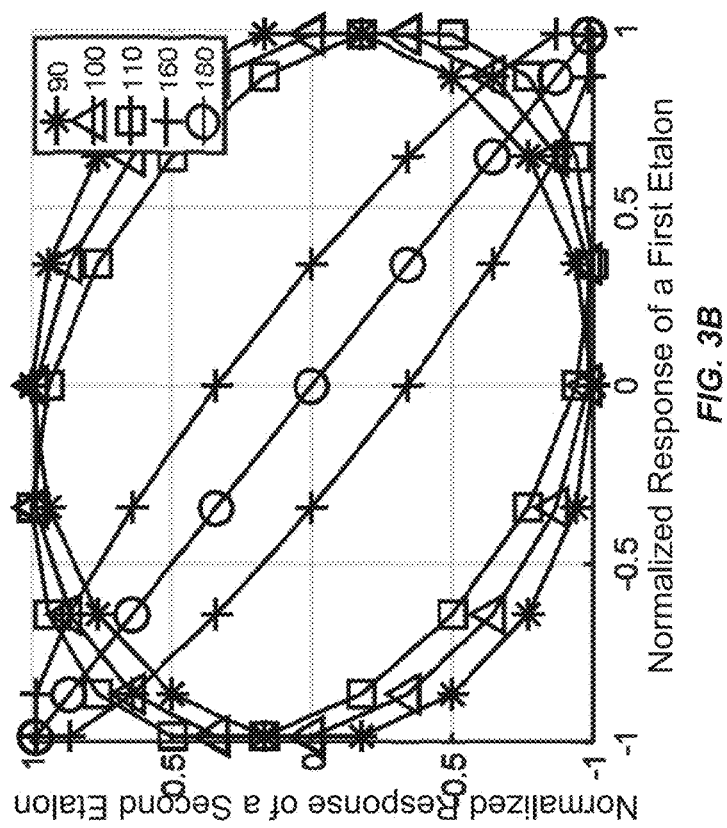
FIG. 3A and FIG. 3B show the calculated normalized etalon responses for two etalons plotted on a single plot. Different lines represent different amounts of phase shift between respective transmission (or reflection) spectra of the two etalons.
Figure 3A:
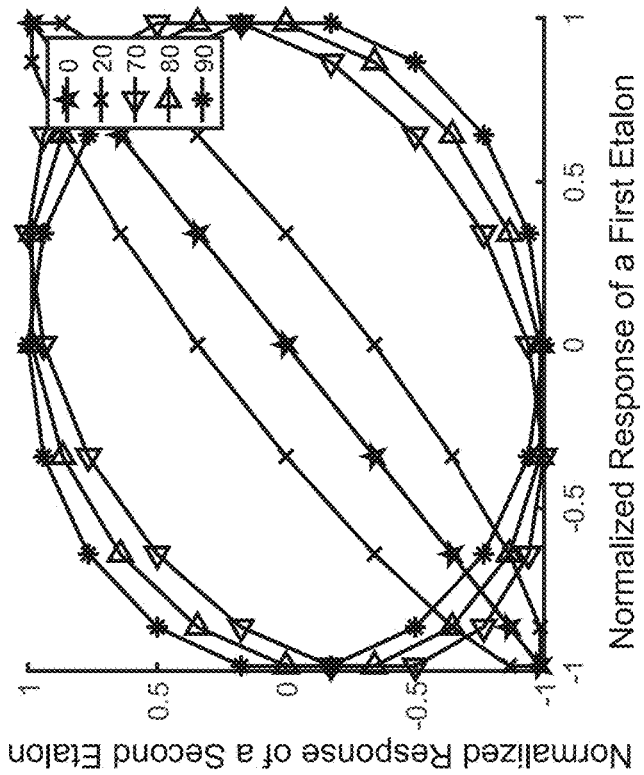

FIG. 3A and FIG. 3B shows the calculated normalized etalon response for two different etalons on a single plot. The normalized etalon response is given by the ratio $R(\lambda)/T(\lambda)$, where $R(\lambda)$ is the intensity of incident light reflected from the etalon and $T(\lambda)$ is the intensity of incident light transmitted through the etalon. In the examples, the two different etalons can have substantially similar FSR and finesse characteristics such that the peaks and the valleys in the transmission (or reflection) spectrum of the two different etalons are aligned when the phase difference between the transmission (or reflection) spectrum of the two etalons is zero or close to zero, or integer multiples of 360 degrees. In various embodiments, a difference in the values of the FSR and finesse for the two different embodiments of the etalon can be less than or equal to about 0.1. For example, a difference in the values of the FSR and finesse for the two different embodiments of the etalon can be greater than or equal to about 0.01 and less than or equal to about 0.1, greater than or equal to about 0.001 and less than or equal to about 0.01, greater than or equal to about 0.0001 and less than or equal to about 0.001, or any value in a range/sub-range defined by any of these values. Values outside these ranges are also possible.

In the examples shown in FIGS. 3A and 3B, the normalized etalon response for the different etalons are calculated for different wavelengths in a 50 GHz frequency span about a center wavelength of about 1550 nm. In FIG. 3A, the normalized etalon response of a first etalon is plotted with respect to the normalized etalon response of a second etalon for relative phase differences of 0 degrees, 20 degrees, 70 degrees, 80 degrees and 90 degrees. In FIG. 3B, the normalized etalon response of a first etalon is plotted with respect to the normalized etalon response of a second etalon for relative phase differences of 90 degrees, 100 degrees, 110 degrees, 160 degrees and 180 degrees.

It is noted from FIGS. 3A and 3B, that the normalized etalon response of a first etalon plotted with respect to the normalized etalon response of a second etalon for relative phase differences of 70 degrees, 80 degrees, 90 degrees, 100 degrees and 110 degrees has a circular or oval shape. It is further noted from FIGS. 3A and 3B, that the normalized etalon response of a first etalon plotted with respect to the normalized etalon response of a second etalon for relative phase differences of 0 degrees, 20 degrees, 90 degrees, 160 degrees and 180 degrees has a linear shape. Accordingly, the relative phase difference between two different etalons can be estimated from the shape of the plot of the normalized etalon response of a first etalon with respect to the normalized etalon response of a second etalon.

A relative phase difference between two different etalons can be provided by changing the relative optical path length between the two different etalons. Without any loss of generality, varying the optical path length of an etalon can change the FSR of the etalon. Without subscribing to any particular theory, the FSR for a given etalon can also be varied by changing the angular orientation of the etalon relative to incident light. The optical path length of an etalon is equal to the product of the index of refraction of the dielectric material in the cavity and the length of the cavity. Accordingly, in various embodiments, the relative phase difference between two different embodiments of an etalon can be achieved by changing the index of refraction of the material in the cavity of one etalon with respect to another, changing the physical length of the cavity of one etalon with respect to another, changing the orientation of the cavity with respect to the direction of incident light of one etalon with respect to another and/or by changing temperature at which one etalon is maintained with respect to another or any combination thereof.

One method for setting the relative phase difference between a first etalon and a second etalon is to angle one of the first or second etalons with respect to the other such that the incident light is incident at one of the first or second etalons at a first angle of incidence and at the other one of the first or second etalons at a second different angle of incidence. In embodiments, where the difference in the optical path length between the first and the second etalon is desired to be in the order of a few 100 nanometers (e.g., sub-wavelength), precise positioning/orienting of the first etalon and the second etalon with respect to the incident beam may be involved. For example, one half wavelength change (e.g., a change in the amount of 600-900 nm) in effective optical thickness of one etalon can shift the reflection peaks of an etalon by $2\pi$ or 360 degrees.

Accordingly, in some methods, the relative angular orientation of the first and the second etalon with respect to the incident light may be set using active alignment. In active alignment, laser light is swept through a range of wavelengths and the normalized responses of the first etalon and the second etalon are measured as a function of wavelength. The desired phase shift between the first and the second etalons can be achieved by manipulating the angle of incident light on one or both etalons, or by manipulating the angle of one or both etalons relative to the incident light. Upon determining the appropriate angular orientation for the first and the second etalons which provides the desired FSR, the positions and the angular orientations of the first and the second etalons maybe fixed (e.g., by soldering, welding, gluing, using an epoxy or some other mechanical method of fixing the etalons in the place). It can be desirable that the positions of the first and second etalons are not changed while they are being fixed in place or once they are fixed in place. For some applications, the precision required for angular positioning of the first and the second etalons with respect to the incident light may be of the order of $\frac{1}{1000}$ of a degree.

Figure 4A:
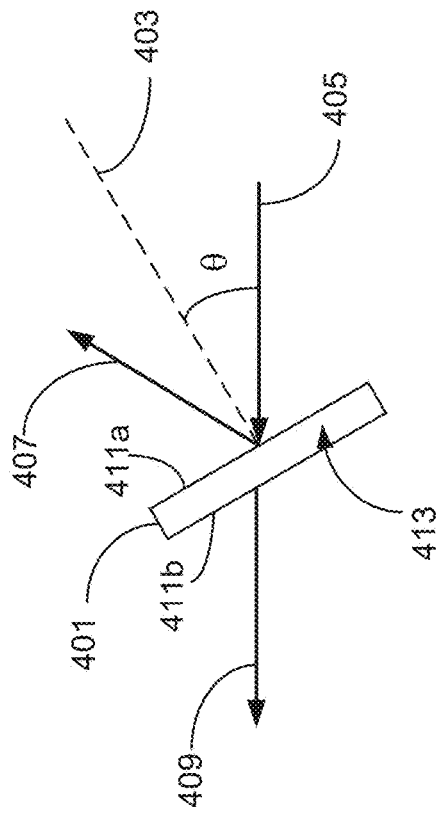
FIG. 4A illustrates an embodiment of an etalon that is tilted with respect to an incident beam of light.
Figure 4B:
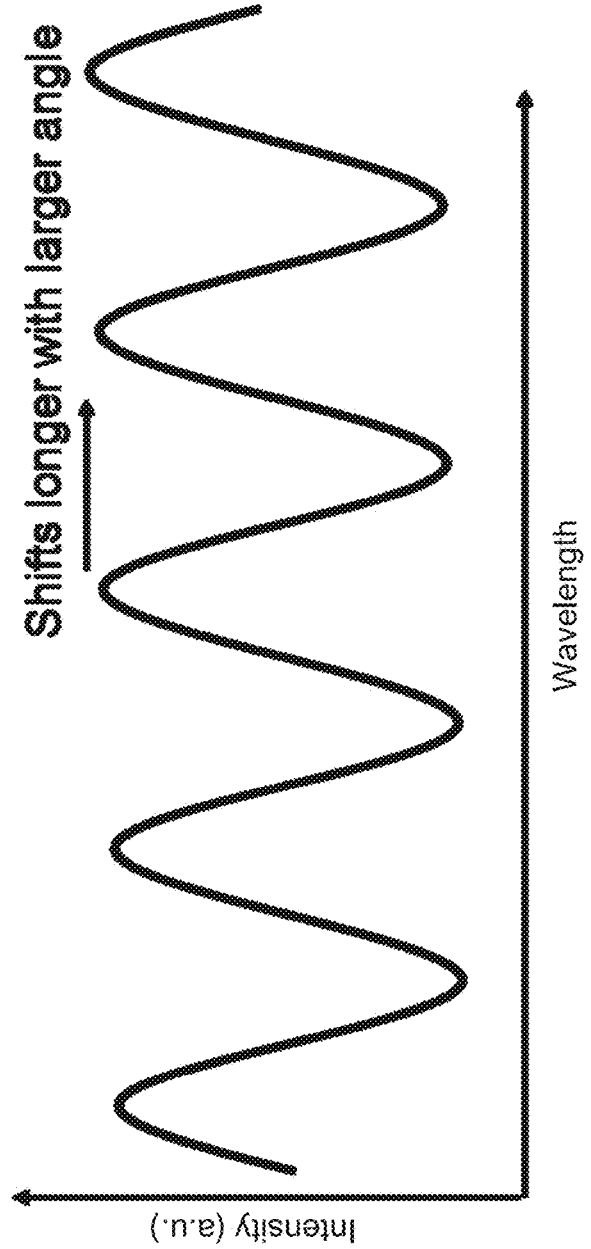
FIG. 4B illustrates the change in the FSR of the illustrated embodiment of the etalon as a function of incident angle.

FIGS. 4A and 4B illustrate an embodiment of the above described method of changing the FSR of an etalon by changing the angle at which light is incident on the etalon. As discussed above, changing the FSR can manifest as a change in phase as changing the FSR can shift the locations of the peaks and valleys of the transmission (or reflection) spectrum in wavelength space.

FIG. 4A illustrates an embodiment of an etalon 401 configured to receive an incident beam of light 405 having a wavelength, $\lambda_i$, at an incident angle θ. A portion of the incident beam 405 is reflected as reflected beam 407 and another portion of the incident beam 405 is transmitted as transmitted beam 409. The normalized response of the etalon 401 can be obtained by taking a ratio of the intensity of the reflected beam 407 to the transmitted beam 409. Without any loss of generality, the etalon 401 comprises a pair of reflective surfaces 411a and 411b bounding a cavity 413. The cavity 413 can comprise a dielectric material, such as, for example, silicon or glass. The incident angle, θ, can correspond to the angle of the incident beam 405 with respect to a normal to the reflective surface 411a that receives the incident light. FIG. 4B shows the normalized response of the etalon 401 as a function of wavelength. The wavelength of the incident beam of light 405 is swept over a wavelength range to obtain the normalized response of the etalon 401. As noted in FIG. 4B, as the incident angle θ is increased, the position of the peaks and valleys shifts towards longer wavelengths along the direction of the arrow.

In systems comprising two or more etalons, positioning (e.g., orienting) the two or more etalons to achieve a desired relative phase difference between the two or more etalons can be difficult and time consuming. Additionally, active alignment (e.g., orientation) techniques such as discussed above or precise passive alignment (e.g., aligning/orienting to fiducials with great accuracy) of the two or more etalons may be used to achieve a desired relative phase difference between the two or more etalons. Furthermore, even after the two or more etalons are precisely aligned/oriented, stress and strain induced by the processes used to fix the two or more etalons in place (e.g., soldering, welding, gluing, epoxying, etc.) can cause deviation in the position/orientation of the two or more etalons from their intended position. This deviation may result in a change in the relative phase difference between the two or more etalons.

For example, consider that the first etalon is positioned/oriented (e.g., by active or passive alignment) to receive incident light at a first angle of incidence that provides a first FSR and a first finesse. To achieve a desired relative phase difference, the second etalon must then be very precisely placed with a different position/orientation. Even if the second etalon is precisely positioned/oriented to achieve a desired relative phase difference between the first etalon and the second etalon, for example, by passive or active alignment techniques, the process of fixing the second etalon in place by soldering, welding, gluing, epoxying, or other methods can cause a change in the position/orientation of the second etalon or possibly a change in index of refraction of the dielectric material in the optical cavity of the second etalon, causing the relative phase difference to be perturbed relative to that which was intended.

Furthermore, the positions of the first and the second etalon can also change during optical packaging or testing. For example, in standard optical packaging procedures, stress or strain is often relieved through temperature cycling and/or baking processes. The goal of such processes is to obtain an optical system that will be stable over time and is not prone to creep or movement or change over time. However, this very process of relieving stress or strain, can change the positions/orientations of the first and the second etalons from their intended positions. Other process such as degassing epoxies, vacuum baking, soldering, and other stresses caused by industrial assembly techniques can also change the positions/orientations of the first and the second etalons from their intended positions/orientations. Accordingly, other methods of tuning the relative phase between two or more etalons are desirable.

This application contemplates systems and methods for aligning the phases of two or more etalons using temperature tuning. Systems and methods that change the temperature of one or both the etalons to achieve a relative phase difference between the transmission (or reflection) spectra of two or more etalons are disclosed in this application. The systems and methods disclosed in this application, utilize temperature to move the peaks and valleys in the transmission (or reflection) spectrum of one etalon with respect to the peaks and valleys in the transmission (or reflection) spectrum of another etalon. The systems and methods described in this application can be incorporated in devices that are configured to monitor one or more wavelengths, provide one or more reference wavelengths and/or discriminate between different wavelengths. Using the systems and methods described herein, a relative phase difference between two or more etalons having substantially similar FSR and finesse characteristics can be achieved. For example, a relative phase difference between two etalons whose FSR and/or finesse differ by an amount less than 10% (e.g., less than or equal to 1%, less than or equal to 0.1%, less than or equal to 0.01%) can be achieved using temperature tuning as discussed below. Values outside these ranges are also possible. Temperature tuning can provide a method of shifting the relative FSR of two or more etalons with respect to each other with high precision without imposing stringent requirements on the mechanical placement/orientation of the two or more etalons with respect to each other.

Various embodiments of the systems described herein comprise two or more etalons. The two or more etalons can be passive devices that are not configured to be electrically or optically pumped. The optical cavities of the two or more etalons can comprise different materials, such as for example, dielectric materials, semiconductor materials and/or optical transmissive materials. Without any loss of generality, the different materials in the optical cavities of the two or more etalons are not configured to provide optical gain. The different materials can have different thermal responses. In some other embodiments, the other parameters of the two or more etalons, such as, for example, physical length of the optical cavity, angular orientation of the etalons with respect to the incident beam can be adjusted such that the FSR and/or finesse of the two or more etalons are substantially similar to the each other. For example, the FSR and/or finesse of the two or more etalons can be identical to each other or differ by an amount less than 10% (e.g., less than or equal to 1%, less than or equal to 0.1%, less than or equal to 0.01%). Values outside these ranges are also possible.

One or more temperature controllers can be used to change the temperature of some or all of the two or more etalons to achieve a relative temperature difference between the two or more etalons. The relative temperature difference between the two or more etalons can result in a relative phase difference between the transmission (or refection) spectra of the two or more etalons. By tuning the relative temperature difference between the two or more etalons, the phase of the transmission (or refection) spectra of the two or more etalons can be shifted. This approach is explained herein.

Consider a first etalon whose optical cavity comprises silicon (e.g., doped or undoped silicon) and a second etalon whose optical cavity comprises glass. The thermal response of silicon and glass are different. For example, the thermal expansion and/or the change in the group refractive index or effective refractive index of silicon and glass with temperature may be different. As a result, for example, without subscribing to any scientific theory, the plurality of the peaks of the transmission (or reflection) spectrum of the first etalon comprising silicon can shift by about 10 GHz for a change in temperature of 1 degree Celsius. In contrast, the plurality of the peaks of the transmission (or reflection) spectrum of the second etalon comprising glass can shift by about 1 GHz for a change in temperature of 1 degree Celsius. The difference in the rates at which the plurality of the peaks of the transmission (or reflection) spectrum of the first and second etalon shift for a change in temperature of 1 degree Celsius is a result of combined effects of thermo-optic tuning (e.g., change in refractive index with temperature) and coefficient of thermal expansion, both of which can affect the optical path length of the etalon. Accordingly, a relative shift between the plurality of the peaks of the transmission (or reflection) spectrum of the first etalon and the second etalon can be obtained by changing the temperature of the first etalon or the second etalon by these amounts.

In this manner, a desired phase difference between the first and the second etalon can be achieved by changing the temperature of the first etalon and the second etalon. For example, in some embodiments, the first and the second etalon can be disposed on a common thermal base (also referred to as an optical bed) that is maintained at an initial temperature $T_{init}$ such that the first and the second etalon are both maintained at the initial temperature $T_{init}$. The common thermal base can comprise a thermally conducting material (e.g., a metal). A phase difference between the FSR of the first etalon and the FSR of the second etalon can be introduced by changing the temperature of the common thermal base to a new temperature $T_{new}$ such that the first and the second etalon are both maintained at the new temperature $T_{new}$. The new temperature $T_{new}$ can be higher than or lower than the initial temperature $T_{init}$. By choosing two etalons with different thermal response and tuning the temperature of the optical bed that the two etalons sit on, the relative phase between the etalons can be appropriately adjusted. In this example, where the first etalon comprising silicon and the second etalon comprising glass are disposed on a common thermal base, adjusting the temperature of the common thermal base can cause a relative shift in the peaks and valleys of the transmission (or reflection) spectra of the first and the second etalon at a rate of approximately 9 GHz/degree C.

Figure 5A:
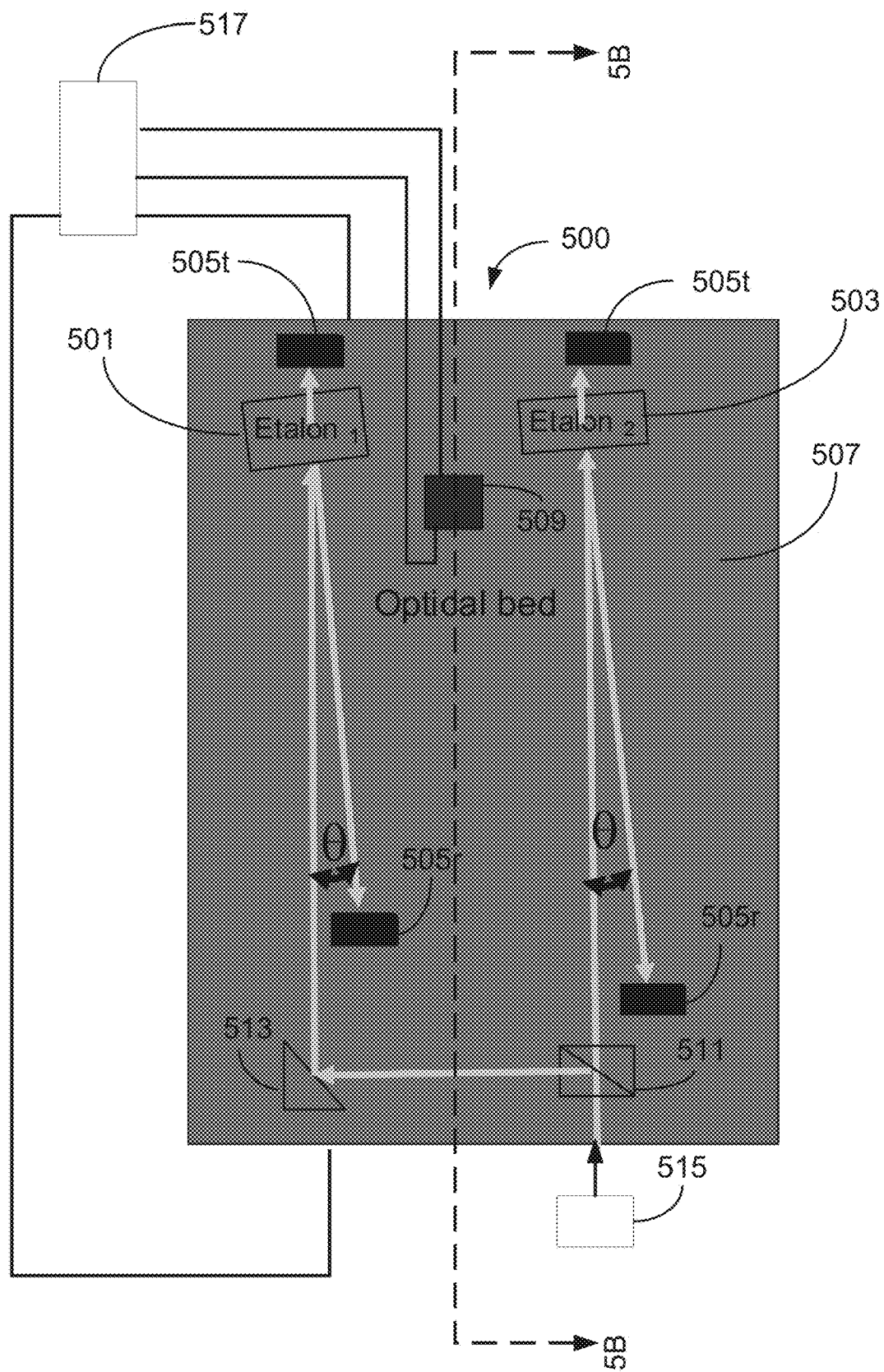
FIG. 5A shows a top view of an embodiment of a device configured to monitor one or more wavelengths, provide one or more reference wavelengths and/or discriminate between different wavelengths.
Figure 5B:
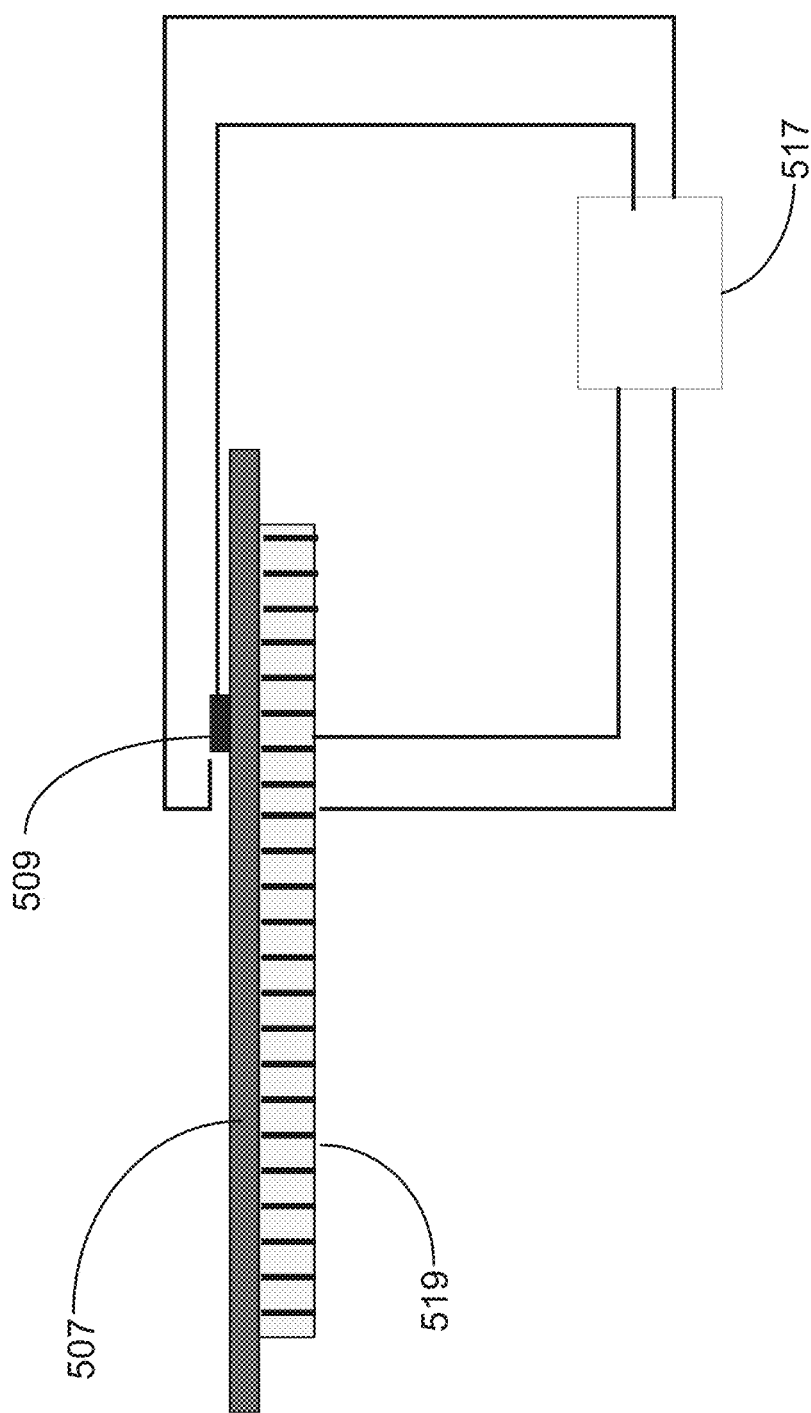
FIG. 5B shows the side of the device depicted in FIG. 5A along the cross section 5B-5B.
Figure 6A:
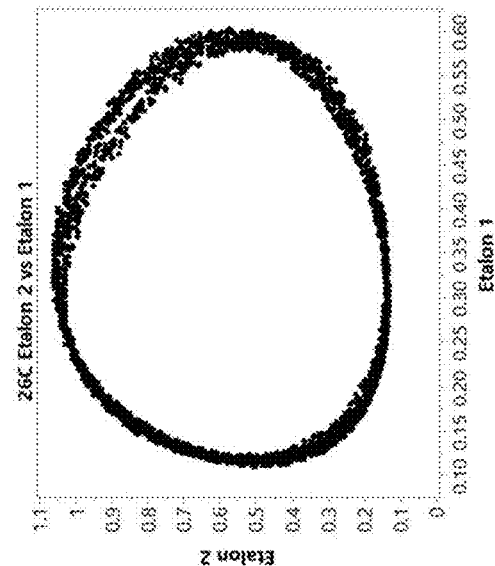
FIGS. 6A-6D are the plots of the normalized etalon response of a first etalon versus the normalized etalon response of a second for different wavelengths. The four plots in FIGS. 6A-6D correspond to four different temperatures respectively.
Figure 6B:
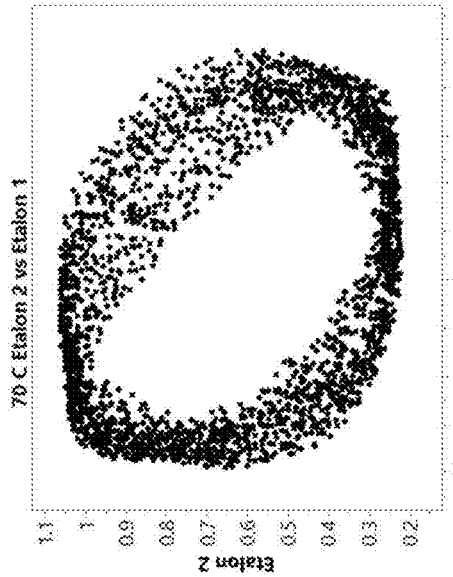
Figure 6C:
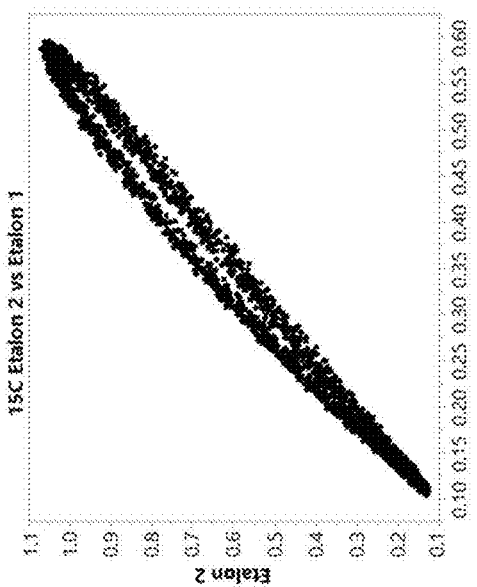
Figure 6D:
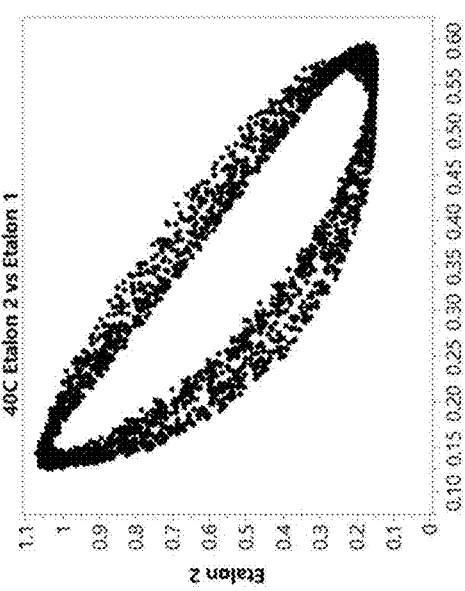

FIG. 5A shows a top view of an embodiment of a device 500 that is configured to monitor one or more wavelengths, provide one or more reference wavelengths and/or discriminate between different wavelengths. FIG. 5B shows the side of the device 500 along the cross section 5B-5B. The embodiment of the device 500 depicted in FIG. 5A comprises a first etalon 501 and a second etalon 503. The first etalon 501 can comprise a first material and the second etalon 503 can comprise a second material different from the first material. The first and second materials can comprise dielectric materials, semiconductor materials and/or optical transmissive materials. The first and second materials are not configured to provide optical gain. The first and second materials are passive materials that are not configured to be electrically and/or optically pumped. The first and the second materials can have different thermal response. For example, the first and the second materials can have different coefficient of thermal expansion. As another example, the change in the group refractive index or effective refractive index of the first material and the second material with temperature may be different.

In various embodiments, at least one of the group index and/or the effective refractive index of the first and the second materials can be different. In various embodiments, the group index of the first and the second materials can be the same or substantially the same. In various embodiments, the effective refractive index of the first and the second materials can be the same or substantially the same. In various embodiments, the group index of the first and the second materials can be the same or substantially the same. In various embodiments, the effective refractive index the first and the second materials can be different or can change differently as a function of temperature. In various embodiments, the variation of the group index as a function of temperature may be different for the first and the second materials. In various embodiments, the first material can comprise silicon and the second material can comprise glass. In some embodiments, the first material can comprise a first type of glass (e.g., N-SF66) and the second material can comprise a second type of glass (e.g., SF-57). Other materials can be used and other combinations are possible.

Without subscribing to any particular theory, the relative phase shift between the plurality of peaks in the transmission (or reflection) spectrum of one etalon and the plurality of peaks in the transmission (or reflection) spectrum of another etalon is a result of a difference in the FSR of the first etalon relative to the second etalon which is brought about by changing the optical path length of the optical cavities of the first and the second etalons and/or by changing the orientation of the first and the second etalons with respect to the incoming incident light beam or by applying other stimuli. The change in the FSR of the first and the second etalons can be wavelength dependent. The change in the FSR of the first and the second etalons with such stimuli can be constant or nearly constant in a certain wavelength range such that the relative phase shift between the plurality of peaks in the transmission (or reflection) spectrum of two etalons is constant or nearly constant within that wavelength range. The wavelength range over which the difference in phase of the first and the second etalons is constant or nearly constant determines the operating wavelength range of the system. Outside the operating wavelength range, the difference in FSR of the first etalon relative to the second etalon can result in the relative phase shift between the plurality of peaks in the transmission (or reflection) spectrum of two etalons having a value different from the desired value. In some embodiments, the first and second materials can be selected such that the variation of the group index, and therefore FSR of the first and second materials as a function of temperature can counter the difference in the variation of FSR of the first etalon and the second etalon. This can advantageously increase the operating wavelength range.

In various embodiments, various parameters of the etalon, such as, for example, physical length of the optical cavity of the first etalon and the second etalon, the position/orientation of the first etalon and the second etalon with respect to the incident beam of light can be adjusted such that the FSR and/or the finesse of the first etalon and the second etalon is substantially similar in a wavelength range of about 100 nm-250 nm about a central wavelength having a value between about 1200 nm and about 1800 nm. For example, a difference in the FSR and/or the finesse of the first etalon and the second etalon can be less than about 10%, less than or equal to about 1%, less than or equal to about 0.1%, less than or equal to about 0.01%, less than or equal to about 0.001% in a wavelength range between 1500 nm and about 1750 nm. As another example, a difference in the FSR and/or the finesse of the first etalon and the second etalon can be less than about 10%, less than or equal to about 1%, less than or equal to about 0.1%, less than or equal to about 0.01%, less than or equal to about 0.001% in a wavelength range between 1500 nm and about 1620 nm. As another example, a difference in the FSR and/or the finesse of the first etalon and the second etalon can be less than about 10%, less than or equal to about 1%, less than or equal to about 0.1%, less than or equal to about 0.01%, less than or equal to about 0.001% in a frequency span of about ±50 GHz about a central wavelength of about 1550 nm. Values outside these ranges are also possible.

The first etalon 501 is positioned/oriented to receive light from an optical source 515 at a first incident angle and the second etalon 503 is positioned/oriented to receive light from the optical source 515 at a second incident angle. The first incident angle and the second incident angle can be the same as shown in FIG. 5A. However, in other embodiments, the first incident angle and the second incident angle can be different from each other. Light from the optical source 515 can be directed towards the first etalon 501 and the second etalon 503 using free space optical components, such as, for example, a beam splitter 511 and a turning mirror 513. In some embodiments, the turning mirror 513 can comprise a prism. In some other embodiments, light from the optical source 515 can be directed towards the first etalon 501 and the second etalon 503 using optical fiber based devices (e.g., fiber splitters) or other optical elements.

The device 500 can comprise a pair of photodetectors 505r configured to receive light reflected from the first etalon 501 and the second etalon 503. The device 500 can further comprise a pair of photodetectors 505t configured to receive light transmitted through the first etalon 501 and the second etalon 503. Although, the embodiment depicted in FIG. 5A includes both pairs of photodetectors 505r and 505t, other embodiments may comprise only a single pair of photodetectors 505r or 505t. Some embodiments, can include a first photodetector 505r disposed with respect to the first etalon 501 and configured to receive light reflected from the first etalon 501 and a second photodetector 505t disposed with respect to the second etalon 503 and configured to receive light transmitted through the second etalon 503.

The first etalon 501 and the second etalon 503 can be disposed on a common thermal base 507 as shown in FIG. 5A. The common thermal base 507 can comprise a thermally conductive material (e.g., a metal). The common thermal base 507 can be thermally coupled to a temperature sensor 509 and a thermo-electric cooler (TEC) 519 shown in FIG. 5B. The temperature sensor 509 can comprise a thermistor or a thermocouple. A temperature controller 517 can be used to maintain the temperature of the common thermal base 507 at a desired temperature. Accordingly, the first etalon 501 and the second etalon 503 are maintained at a common temperature in the embodiment depicted in FIG. 5A. However, in some embodiments, the first etalon 501 and the second etalon 503 need not be disposed on a common thermal base. Instead, the system can be configured such that the first etalon 501 and the second etalon 503 are maintained at different temperatures. In some embodiments, the other components of device 500 such as, for example, the beam splitter 511, the turning mirror 513, the pair of photodetectors 505r, and/or the pair of photodetectors 505t can also be integrated with the common thermal base 507 as shown in FIG. 5A.

Changing the temperature of the common thermal base 507 (or changing the temperature of at least one of the first etalon 501 or the second etalon 503) can cause the FSR of one etalon to shift in the wavelength space in a manner that is different from the shift of the FSR of the other etalon in wavelength space. In various embodiments, the first dielectric material, the second dielectric material and other parameters of the first etalon 501 and the second etalon 503 can be selected such that by tuning the temperature of at least one of the first etalon 501 or the second etalon 503, a phase difference (e.g., a constant phase difference) between the peaks and valleys of the FSR of the first etalon 501 and the second etalon 503 can be maintained over a wavelength range between 100 nm-250 nm around a central wavelength having a value between 1200 nm and 1800 nm. For example, in some embodiments, by tuning the temperature of the first etalon 501 and the second etalon 503, a constant phase difference of about 90 degrees between the peaks and valleys of the FSR of the first etalon 501 and the second etalon 503 can be maintained for wavelengths between about 1500 nm and about 1750 nm. As another example, by tuning the temperature of the first etalon 501 and the second etalon 503, a constant phase difference of about 90 degrees between the peaks and valleys of the FSR of the first etalon 501 and the second etalon 503 can be maintained for wavelengths between about 1500 nm and about 1620 nm.

In various embodiments, the temperature of the first etalon 501 and the second etalon 503 may be controlled by a single thermoelectric cooler (TEC) 519 and a sensor 509 as shown in FIG. 5A. In some other embodiments, the temperature of the first etalon 501 and the second etalon 503 may be controlled by a plurality of thermoelectric coolers and/or temperature sensors. In some embodiments, one or more temperature sensors may be placed adjacent to or directly on top of one or both of the first etalon 501 and the second etalon 503 and used as feedback to precisely control the temperature of an individual etalon. Using the system and method described above, the first etalon 501 and the second etalon 503 can be passively placed at nominally the same angle with respect to the incident light beam. The temperature of at least one of the first etalon 501 and the second etalon 503 can be changed subsequently to introduce a relative phase shift between the plurality of peaks of the transmission (or reflection) spectrum of the first etalon 501 and the plurality of peaks of the transmission (or reflection) spectrum of the second etalon 503. This can simplify the complexity of the assembly process because the relative angle of incidence of light between the two etalons does not need to be controlled precisely.

In various embodiments, the first etalon 501 and the second etalon 503 need not be disposed on the common thermal base 507 such that they are both maintained at the same temperature. Instead, the temperature of the first etalon 501 and the second etalon 503 can be independently controlled. For example, in some embodiments, a first thermoelectric cooler and sensor pair can be used to maintain the first etalon 501 at a first temperature and a second thermoelectric cooler and sensor pair can be used to maintain the second etalon 503 at a second temperature. The first and the second temperature can be independently controlled by using one or more temperature controllers. However, systems that employ single thermoelectric cooler maybe less expensive and less bulky than systems that employ multiple thermoelectric coolers.

In some embodiments, the first etalon 501 and the second etalon 503 can be aligned using the active alignment technique with the aim of achieving the desired relative phase difference between the plurality of peaks of the transmission (or reflection) spectrum of the first etalon 501 and the plurality of peaks of the transmission (or reflection) spectrum of the second etalon 503. After the positions of the first etalon 501 and the second etalon 503 are fixed and the system is packaged, temperature tuning can be used to realign the plurality of peaks of the transmission (or reflection) spectrum of the first etalon 501 and the second etalon 503 to obtain the desired phase difference as needed. In this manner, temperature tuning can be used to compensate for any shift in the plurality of peaks of the transmission (or reflection) spectrum of the first etalon 501 and the second etalon 503 as a result of the stresses and/or strains and/or other misalignments and/or perturbations introduced during the process of fixing the positions of the first etalon 501 and the second etalon 503 and/or during packaging the system.

In various embodiments, the plurality of peaks of the transmission (or reflection) spectrum of the first etalon 501 and the second etalon 503 may drift over time due to stresses, strains, temperature fluctuations, or other internal or external influences on the first etalon 501 and the second etalon 503. In such circumstances, temperature tuning can be used to readjust the plurality of peaks of the transmission (or reflection) spectrum of the first etalon 501 and the second etalon 503 with respect to each other to the achieve the desired phase difference. In some embodiments, temperature tuning can be used to achieve a desired shape of the plot of the normalized response of the first etalon 501 versus the normalized response of the second etalon 503. As discussed above with reference to FIGS. 3A and 3B, the shape of the plot of the normalized response of the first etalon 501 versus the normalized response of the second etalon 503 can be indicative of the amount of phase shift between the plurality of peaks of the transmission (or reflection) spectrum of the first etalon 501 and the second etalon 503.

The embodiment of the device 500 was tested using light from a tunable optical source as the input. The tunable optical source comprised a tunable laser configured to provide light at different wavelengths between 1500 nm and 1620 nm. The normalized etalon response ($R(\lambda)/T(\lambda)$) of the first etalon 501 and the second etalon 503 was obtained for a plurality of wavelengths between 1500 nm and 1620 nm for four different temperatures of the common thermal base 507. FIGS. 6A-6D shows the plot of the normalized etalon response of the first etalon 501 with respect to the normalized etalon response of the second etalon 503 when the temperature of the common thermal base 507 was 15 degree C., 26 degree C., 40 degree C. and 70 degree C. respectively. Each point in FIGS. 6A-6D represents a wavelength. In FIGS. 6A-6D, the x-axis is the normalized etalon response ($R(\lambda)/T(\lambda)$) of the first etalon 501 and the y-axis is the normalized etalon response ($R(\lambda)/T(\lambda)$) of the second etalon 503. Using the plots of FIGS. 3A and 3B as a template, it is inferred that when the temperature of the common thermal base 507 was 15 degree C., the phase difference between the plurality of peaks of the transmission (or reflection) spectrum of the first etalon 501 and the second etalon 503 was between 0 degrees and about 20 degrees. When the temperature of the common thermal base 507 was 26 degree C., the phase difference between the plurality of peaks of the transmission (or reflection) spectrum of the first etalon 501 and the second etalon 503 was between 70 degrees and about 110 degrees. When the temperature of the common thermal base 507 was 40 degree C., the phase difference between the plurality of peaks of the transmission (or reflection) spectrum of the first etalon 501 and the second etalon 503 was between 160 degrees and about 180 degrees. When the temperature of the common thermal base 507 was 70 degree C., the phase difference between the plurality of peaks of the transmission (or reflection) spectrum of the first etalon 501 and the second etalon 503 was about 720 degrees. The dependency may be different from different design configurations and/or devices.

Various embodiments of the system 500 may be provided with electronic processors that are configured to output the normalized etalon response of the first etalon 501 and the second etalon 503 to a display device. The display device may be configured to display the normalized etalon response of the first etalon 501 and the second etalon 503 on a single plot as shown in the non-limiting examples depicted in FIGS. 3A, 3B and 6A-6D. In various embodiments, the plot of the normalized etalon response of the first etalon 501 versus the normalized etalon response of the second etalon 503 displayed on the display device may be updated in real time or in sufficiently real time as the temperature of the first etalon 501 and/or second etalon 503 is changed. In this manner, the temperature of the first etalon 501 and/or second etalon 503 can be adjusted to set the phase shift between the plurality of peaks of the transmission (or reflection) spectrum of the first etalon 501 and the second etalon 503 to a desired value.

While the foregoing detailed description discloses several embodiments of the present invention, it should be understood that this disclosure is illustrative only and is not limiting of the present invention. It should be appreciated that the specific configurations and operations disclosed can differ from those described above, and that the apparatus and methods described herein can be used in contexts. Additionally, components can be added, removed, and/or rearranged. Additionally, processing steps may be added, removed, or reordered. A wide variety of designs and approaches are possible.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed:

1. An optical device configured to monitor the wavelength of incident light over an operating wavelength range, the optical device comprising:
   a first etalon comprising a first reflector and a second reflector and an optical cavity therebetween, the optical cavity of the first etalon having a first optical path length, the optical cavity of the first etalon comprising a first material, wherein a transmission spectrum of the first etalon or a reflection spectrum of the first etalon has a first plurality of peaks;
   a second etalon comprising a first reflector and a second reflector and an optical cavity therebetween, the optical cavity of the second etalon having a second optical path length, the optical cavity of the second etalon comprising a second material, wherein a transmission spectrum of the second etalon or a reflection spectrum of the second etalon has a second plurality of peaks; and an optical element configured to direct a first portion of the incident light to the first etalon and a second portion of the incident light to the second etalon, a temperature control system configured to tune the temperature of at least one of the first etalon and the second etalon, wherein a variation of the group refractive index or the effective refractive index of the first material with respect to temperature is different from a variation of the group refractive index or the effective refractive index of the second material with respect to temperature, wherein at least one of (a) said first optical path length and the second optical path or (b) the angle of incidence of an incident light beam with respect to the first etalon and the angle of incidence of an incident light beam with respect to the second etalon is configured, and the temperature of at least one of the first etalon and the second etalon is tuned by the temperature control system, so as to provide a phase shift between the first plurality of peaks in the transmission spectrum or reflection spectrum of the first etalon and the second plurality of peaks in the transmission spectrum or reflection spectrum of the second etalon, wherein a variation of the phase shift over a wavelength range of 120 nm is equal or less than 40 degrees, and wherein the first etalon has a free spectral range and the second etalon has a free spectral range and the difference between the first and second free spectral ranges is less than 10% over said operating wavelength range.

2. The optical device of claim 1, wherein the phase shift is greater than 0 degrees and less than or equal to about 20 degrees.

3. The optical device of claim 1, wherein the phase shift is greater than or equal to 70 degrees and less than or equal to about 110 degrees.

4. The optical device of claim 1, wherein the phase shift is greater than or equal to 160 degrees and less than or equal to about 180 degrees.

5. The optical device of claim 1, wherein the temperature control system is further configured to change the temperature of the first etalon and the second etalon.

6. The optical device of claim 1, wherein the temperature control system comprises a thermoelectric cooler thermally coupled to at least one of the first etalon or the second etalon.

7. The optical device of claim 6, wherein the temperature control system further comprises a temperature sensor thermally coupled to at least one of the first etalon or the second etalon.

8. The optical device of claim 7, wherein the temperature control system further comprises a temperature controller configured to control the thermoelectric cooler based on information from the temperature sensor.

9. The optical device of claim 7, wherein the temperature sensor comprises a thermistor or a thermocouple.

10. The optical device of claim 1, further comprising a thermal base, wherein the first etalon and the second etalon are disposed on the thermal base.

11. The optical device of claim 10, wherein the thermal base comprises a thermally conductive material.

12. The optical device of claim 10, wherein the thermal base is thermally coupled to a thermoelectric cooler and a thermal sensor.

13. The optical device of claim 12, wherein the temperature control system is further configured to maintain the thermal base at a desired temperature such that the first etalon and the second etalon are both maintained at the desired temperature.

14. The optical device of claim 1, wherein the temperature control system is configured to change the phase shift between the plurality of peaks in the transmission spectrum or reflection spectrum of the first etalon and the plurality of peaks in the transmission spectrum or reflection spectrum of the second etalon by changing the temperature of at least one of the first etalon or the second etalon to increase wavelength sensitivity or wavelength resolution of the optical device.

15. The optical device of claim 1, further comprising a first photodetector configured to measure light reflected from the first etalon, and a second photodetector configured to measure light reflected from the second etalon.

16. The optical device of claim 1, further comprising a first photodetector configured to measure light transmitted through the first etalon, and a second photodetector configured to measure light transmitted through the second etalon.

17. The optical device of claim 1, further comprising a first photodetector configured to measure light transmitted through the first etalon, and a second photodetector configured to measure light reflected from the second etalon.

18. The optical device of claim 1, said optical element configured to direct a first portion of the incident light to the first etalon and a second portion of the incident light to the second etalon comprises a beamsplitter.

19. The optical device of claim 1, wherein the first etalon has a free spectral range and the second etalon has a free spectral range and the difference between the first and second free spectral ranges is less than 1% over said operating wavelength range.

20. The optical device of claim 1, wherein said operating wavelength range is between 1500 nm and 1620 nm.

21. An optical device configured to monitor the wavelength of incident light over an operating wavelength range, the optical device comprising:

a first optical cavity comprising a first material, the first optical cavity bound by a pair of reflective surfaces, the first optical cavity configured to receive light at a first angle of incidence;

a second optical cavity comprising a second material different from the first material, the second optical cavity bound by a pair of reflective surfaces, the second optical cavity configured to receive light at a second angle of incidence;

an optical element configured to direct a first portion of the incident light to the first optical cavity and a second portion of the incident light to the second optical cavity, a first photodetector disposed with respect to the first optical cavity to receive light therefrom; and a second photodetector disposed with respect to the second optical cavity to receive light therefrom, a temperature control system configured to tune the temperature of at least one of the first optical cavity and the optical cavity, wherein an optical path length of the first optical cavity and an optical path length of the second optical cavity are adjusted by the temperature control system, and the first angle of incidence and the second angle of incidence are configured such that a plurality of peaks in a transmission or a reflection spectrum of the first optical cavity are shifted with respect to a plurality of peaks in a transmission or a reflection spectrum of the second optical cavity by a phase shift that varies less than or equal to 40 degrees over a wavelength range of 120 nm.

22. The optical device of claim 21, wherein the location of the maxima of the plurality of peaks in the transmission or reflection spectrum of the second optical cavity coincide with the location of the plurality of peaks in the transmission or reflection spectrum of the first optical cavity having a slope greater than the slope at the maxima.

23. The optical device of claim 21, further comprising:
a third photodetector disposed with respect to the first optical cavity; and
a fourth photodetector disposed with respect to the second optical cavity.

24. The optical device of claim 23, wherein the first photodetector is configured to receive light reflected from the first optical cavity, and wherein the third photodetector is configured to receive light transmitted through the first optical cavity.

25. The optical device of claim 23, wherein the second photodetector is configured to receive light reflected from the second optical cavity, and wherein the fourth photodetector is configured to receive light transmitted through the second optical cavity.

26. The optical device of claim 21, wherein the first optical cavity and the second optical cavity are disposed on a thermal base.

27. The optical device of claim 26, further comprising:
a temperature sensor thermally coupled to the thermal base; and
a thermoelectric cooler thermally coupled to the thermal base;
wherein the temperature control system is further configured to maintain the thermal base at a desired temperature.

28. The optical device of claim 27, wherein the temperature control system is further configured to change the temperature of the thermal base from a first temperature to a second temperature.

29. The optical device of claim 28, wherein a thermal response of the first material is different from a thermal response of the second material such that the plurality of peaks in the transmission or reflection spectrum of the first optical cavity are further shifted with respect to a plurality of peaks in the transmission or reflection spectrum of the second optical cavity in wavelength space in response to a change in the temperature of the thermal base from the first temperature to the second temperature.

30. The optical device of claim 21, said optical element configured to direct a first portion of the incident light to the first optical cavity and a second portion of the incident light to the second optical cavity comprises a beamsplitter.

31. The optical device of claim 21, wherein said operating wavelength range is between 1500 nm and 1620 nm.

32. The optical device of claim 21, wherein the first optical cavity has a free spectral range and the second optical cavity has a free spectral range and the difference between the first and second free spectral ranges is less than 10% over said operating wavelength range.

33. The optical device of claim 21, wherein the first optical cavity has a free spectral range and the second optical cavity has a free spectral range and the difference between the first and second free spectral ranges is less than 1% over said operating wavelength range.

34. An optical device configured to monitor the wavelength of incident light over an operating wavelength range, the optical device comprising:
a first optical cavity comprising a first material, the first optical cavity bound by a pair of reflective surfaces;
a second optical cavity comprising a second material different from the first material, the second optical cavity bound by a pair of reflective surfaces;
an optical element configured to direct a first portion of the incident light to the first optical cavity and a second portion of the incident light to the second optical cavity,
a first photodetector disposed with respect to the first optical cavity to receive light therefrom;
a second photodetector disposed with respect to the second optical cavity to receive light therefrom; and
a temperature controller configured to adjust the temperature of at least one of the first optical cavity or the second optical cavity, such that
a plurality of peaks in a transmission or a reflection spectrum of the first optical cavity are shifted with respect to a plurality of peaks in a transmission or a reflection spectrum of the second optical cavity by a phase shift of less than 40 degrees over a wavelength range of 120 nm.

35. The optical device of claim 34, wherein the first optical cavity and the second optical cavity are disposed on a common thermal base.

36. The optical device of claim 35, wherein the common thermal base is thermally coupled to a thermoelectric cooler.

37. The optical device of claim 36, wherein the temperature controller is configured to provide signals to the thermoelectric cooler to maintain the common thermal base at a common temperature such that the first optical cavity and the second optical cavity are maintained at the common temperature.

38. The optical device of claim 34, said optical element configured to direct a first portion of the incident light to the first optical cavity and a second portion of the incident light to the second optical cavity comprises a beamsplitter.

39. The optical device of claim 34, wherein said operating wavelength range is between 1500 nm and 1620 nm.

40. The optical device of claim 34, wherein the first optical cavity has a free spectral range and the second optical cavity has a free spectral range and the difference between the first and second free spectral ranges is less than 10% over said operating wavelength range.

41. The optical device of claim 34, wherein the first optical cavity has a free spectral range and the second optical cavity has a free spectral range and the difference between the first and second free spectral ranges is less than 1% over said operating wavelength range.

* * * * *